United States Patent [19]

Crain et al.

[11] Patent Number: 5,025,436
[45] Date of Patent: Jun. 18, 1991

[54] DISK CARTRIDGE POSITIONING MECHANISM FOR AN INFORMATION STORAGE DISK DRIVE SYSTEM

[75] Inventors: Ronald A. Crain, San Jose; Harney James D., Mountainview, both of Calif.; James R. Carey, Rochester, N.Y.

[73] Assignee: Literal Corporation, Colorado Springs, Colo.

[21] Appl. No.: 287,806

[22] Filed: Dec. 20, 1988

[51] Int. Cl.⁵ .................. G11B 33/02; G11B 17/04
[52] U.S. Cl. .................... 369/77.2; 369/75.1; 369/75.2; 369/77.1; 360/99.06; 360/99.07
[58] Field of Search .............. 369/75.2, 77.1, 77.2, 369/75.1, ; 360/97, 99, 113, 9.01, 99.02, 99.03, 99.05, 99.06, 99.07

[56] References Cited

U.S. PATENT DOCUMENTS

| | | | |
|---|---|---|---|
| 4,482,991 | 11/1984 | Kawamura et al. | 369/77.2 |
| 4,604,666 | 8/1986 | Kitahara et al. | 360/99 |
| 4,625,304 | 11/1986 | Kanamaru et al. | 369/75.2 |
| 4,651,240 | 3/1987 | Okita et al. | 360/99.06 |
| 4,656,544 | 4/1987 | Yamanouchi et al. | 360/97 |
| 4,679,182 | 7/1987 | Kamoshita et al. | 369/77.2 |
| 4,695,996 | 9/1987 | Sugihara et al. | 369/77.1 |
| 4,707,819 | 11/1987 | Ehara | 369/77.2 |
| 4,707,821 | 11/1987 | Verhagen | 369/77.2 |
| 4,729,047 | 3/1988 | Kanno | 360/97 |
| 4,739,428 | 4/1988 | Kamoshita et al. | 360/99.07 |
| 4,786,998 | 10/1988 | Sugawara et al. | 369/77.2 |
| 4,794,481 | 12/1988 | Suyama et al. | 360/99.06 |
| 4,829,393 | 5/1989 | Shimizu et al. | 360/99.07 |
| 4,866,693 | 9/1989 | Odawara et al. | 369/77.2 |
| 4,872,076 | 10/1989 | Uehara et al. | 360/99.07 |
| 4,941,140 | 7/1990 | Ono et al. | 369/77.2 |

Primary Examiner—Stuart S. Levy
Assistant Examiner—Tan Nguyen
Attorney, Agent, or Firm—Kinney & Lange

[57] ABSTRACT

Cartridge positioning apparatus for loading and unloading the disk cartridge of an information storage disk drive system employs a dual function, motor-actuated, laterally moving linear drive mechanism to drive a plurality of drive plates located in an interstitial space between a cartridge receiving guide means and a central mount plate by means of a drive tab extending up through the mount plate. The tab engages a camming plate which operates against the central portion of a pivoted sector gear to convert the lateral tab drive motion into amplified longitudinal motion parallel with the direction that the disk cartridge is inserted and removed. The camming plate includes an idling provision to hold the sector gear stationary while the motor-performs other load functions. The sector gear drives a longitudinal drive mechanism which carries one or more members adapted to contact the disk cartridge for loading or unloading the cartridge depending on the direction of movement of the motor-actuated drive tab.

6 Claims, 6 Drawing Sheets

DISK CARTRIDGE POSITIONING MECHANISM FOR AN INFORMATION STORAGE DISK DRIVE SYSTEM

CROSS-REFERENCE TO RELATED APPLICATION

Reference is made to the following U.S. patent applications, all filed concurrently herewith:

Ser. No. 07/287,805, entitled LOAD MECHANISM FOR A BEAM ADDRESSABLE INFORMATION STORAGE DISK DRIVE SYSTEM by James R. Carey, David L. Rowden and Patrick Champagne;

Ser. No. 07/287,803, entitled TWO-STAGE LINEAR DRIVE APPARATUS FOR AN INFORMATION STORAGE DISK DRIVE SYSTEM by James R. Carey and Patrick Champagne;

Ser. No. 07/287,802, entitled INFORMATION STORAGE DISK LOADING APPARATUS WITH DRIVE GEAR OVERLOAD PROTECTION by James R. Carey.

FIELD OF THE INVENTION

This invention relates to apparatus for positioning a disk cartridge in an information storage disk drive system. The invention has particular utility as apparatus for loading and unloading a disk cartridge, under power, in an optical or magneto-optical disk drive system.

BACKGROUND OF THE INVENTION

There is a need for compactly structured beam addressable information storage disk drive systems capable of fitting within the half height format of a personal computer drive bay. The problem of achieving this objective is complicated somewhat by the fact that beam addressable storage disks are rigid plastic disks many times the thickness of flexible ("floppy") disks commonly used as removable storage media for personal computers. Moreover, such disks are generally encased in protective hard shelled cartridges that add to the bulk of the disk assembly that must be accommodated in the drive system. Unlike conventional high capacity magnetic disk drive systems employing small magnetic sensor heads positioned at the end of an arm in direct or semi-direct contact with a non-removable magnetic disk, a magneto-optical drive system must accommodate a relatively bulky optical read/write head to scan the data tracks on the disk. Such a system has the highly desirable advantage of allowing the use of removable disk storage media but at the expense of requiring the use of considerable space devoted to the scanning read/write head and associated control components.

Thus, in order to minimize the space within the drive system devoted to loading and unloading the disk cartridge, it has been proposed to utilize a system in which the cartridge is loaded and held in its own plane within the drive system with the spindle drive being translated from a non-operational position to an operational position in which the spindle is engaged with the disk central hub. While this arrangement frees up space in the drive that would otherwise be required to accommodate translation of the cartridge to bring the disk into engagement with a fixed spindle, it puts a premium on proper initial positioning of the cartridge and its disk relative to the spindle axis. Accordingly, it is desirable that the cartridge be provided with automatic powered loading, at least during the final phase of the loading, to assure proper positioning each time a cartridge is inserted into the drive.

A related consideration is that when the cartridge is loaded in its operational position within the drive system, it is generally inaccessible to the user. As a consequence, means must be provided to assist in ejecting the cartridge from its position internal to the drive, at least to the point at which it can be readily grasped by the user and manually removed to complete the unloading process. Because of the limited space available to accomplish this initial unloading step, it is highly desirable that the same powering mechanism used to load the cartridge be used for the unloading step as well.

Accordingly, it is an object of the invention to provide a compact disk cartridge positioning mechanism for an information storage disk drive system.

It is another object of the invention to provide a compact, "powered-in" cartridge loading mechanism for a system of the type described that assures proper positioning of the cartridge and its associated disk each time the cartridge is loaded.

It is a further object of the invention provide a compact cartridge unloading mechanism for a system of the type described that utilizes the same drive components that are employed for "powered-in" loading of the cartridge.

It is still a further object of the invention to provide a motor actuated cartridge loading and unloading mechanism for a system of the type described that occupies a minimum of space in the cartridge receiving cavity.

It is yet another object of the invention to provide a powered cartridge loading and unloading mechanism for a system of the type described that operates from a single motor actuator that is also used for other load functions in the disk drive system.

SUMMARY OF THE INVENTION

Thus in accordance with the invention, apparatus is provided for positioning a disk cartridge under power in an information storage disk drive system which comprises, in part, a mount plate and cartridge receiving means for receiving and holding a disk cartridge in its own plane, the cartridge having been at least partially manually inserted in a longitudinal direction, the receiving means being mounted above the mount plate to form a planar interstitial space therebetween. A motor-actuated linear drive means is mounted beneath the mount plate and is provided with a drive tab that extends through the mount plate into the interstitial space for providing linear driving motion in a lateral direction normal to the longitudinal direction of the cartridge receiving means.

The apparatus of the invention further comprises means, including a pivoted sector gear, mounted in said interstitial space and responsive to movement of said tab to convert the lateral driving motion of the tab to the longitudinal direction of the cartridge motion. The apparatus also comprises linear drive means, at least partially mounted within the interstitial space, the linear drive means being in engagement with the sector gear and provided with at least one cartridge contacting member for contacting and moving said cartridge in the longitudinal direction in response to movement of the drive tab in the lateral direction.

DETAILED DESCRIPTION

Figure 1:
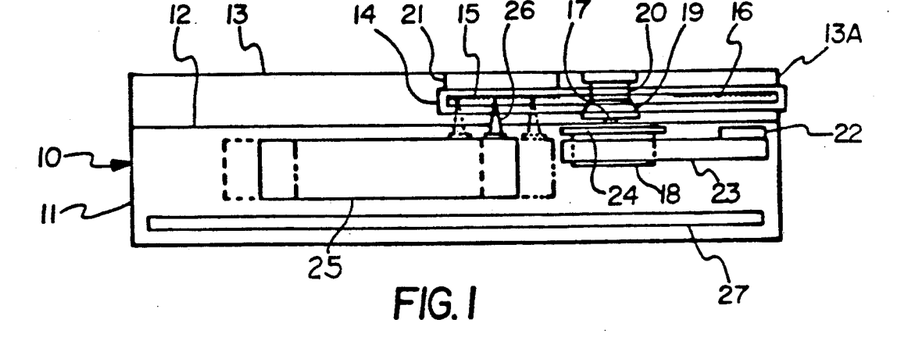
FIG. 1 is a schematic side elevation view of a magneto-optical disk drive system suitable for embodiment therein of cartridge positioning apparatus of the present invention.

Referring to FIG. 1, a schematic side view of an information storage disk drive system 10 of the invention includes a base enclosure 11 having a central mount plate 12 which forms a primary mounting base for the components of the system 10. An upper enclosure 13 includes provision for receiving through front slot 13a and holding in its own plane a disk cartridge 14 having nested therein a magneto-optical information storage disk 15. Closely spaced data tracks 16 are formed in concentric grooves on the upper planar surface of disk 15 by deposition of a recording medium comprising a thin layer of suitable thermo-magneto-optical material utilizing processes well known for this purpose. As an alternative to concentric grooves, data tracks 16 may be "pseudo grooves" comprised of a single elongated track formed in a spiral with its center coincident with the center of disk 15. A drive spindle 17 is drivingly connected, at its lower end, to spindle drive motor 18 and, at its upper end, to a disk engaging chuck and centering cone assembly 19 which cooperates with a disk clamp 20 positioned above disk 15 to engage and rotationally drive the disk during read/write operation of the system 10. An electromagnetic bias coil 21 is held in place on upper enclosure 13 above disk 15 and is supplied with current from a source, not shown, to generate a concentrated magnetic field which is applied to the recording medium of the data tracks 16 as part of the magneto-optical read/write process. Spindle motor 18 is mounted on a vertically movable platform 24 which is supported on a load drive mechanism mount plate 23 by means of a lift apparatus described in more detail subsequently. Load drive apparatus 22 is also housed on mount plate 23 and operates, inter alia, to provide driving force to actuate the lift apparatus.

A read/write head 25 is translatably suspended in base enclosure 11 by means of tracking actuator apparatus which moves the head laterally (right and left as viewed in phantom in the drawing) along a drive path which is parallel to the planar surface of disk 15 and generally radial to the disk center to position and hold a focussed laser optical beam 26 generated within head 25 on a selected one of data tracks 16. Suitable tracking actuator apparatus for this purpose is disclosed in copending application Ser. No. 07/287,801, filed Dec. 20, 1988, entitled SINGLE STAGE TRACKING ACTUATOR APPARATUS FOR OPTICAL BEAM INFORMATION STORAGE DRIVE SYSTEM and the details are not repeated here as they are not required for an understanding of the present invention. A printed circuit board 27 may be positioned along the bottom of base enclosure 11 to provide necessary control functions for operation of the disk drive system.

Figure 2:
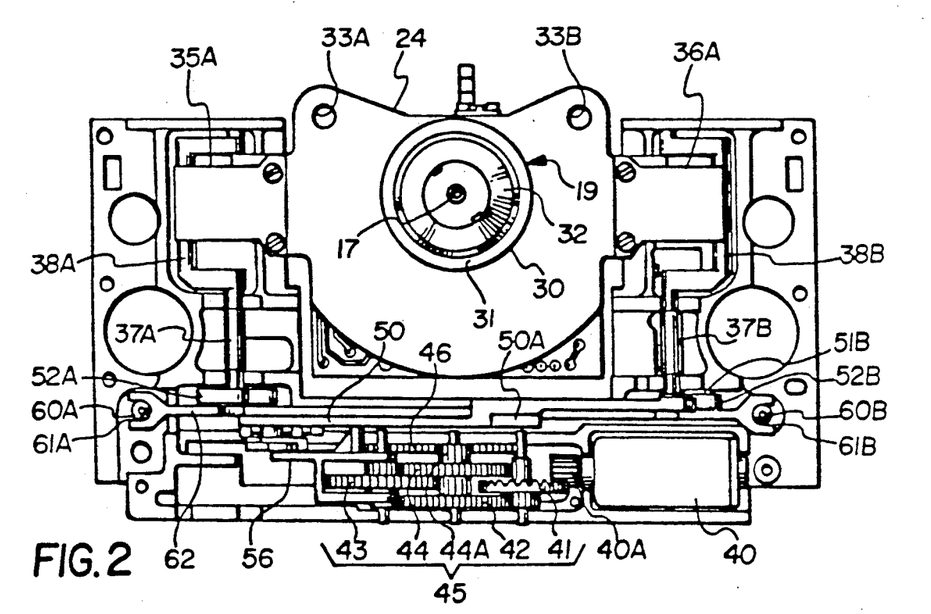
FIG. 2 is a top plan view of a load drive mechanism illustrating a motor-actuated lateral linear drive serving as the motive force for the cartridge positioning apparatus of the present invention.
Figure 3:
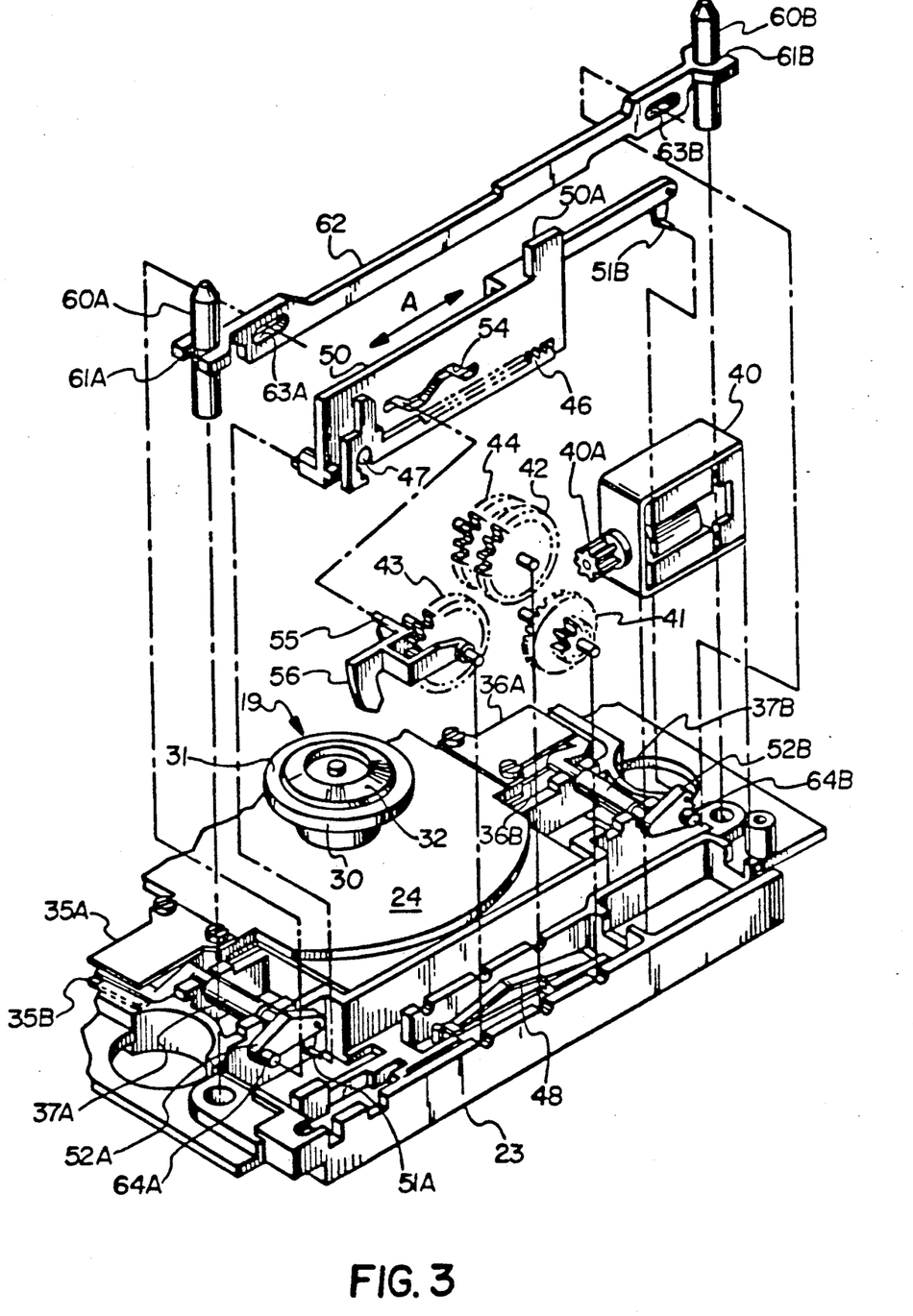
FIG. 3 is a front partially exploded perspective view of the load drive mechanism of FIG. 2.

Referring now jointly to FIGS. 2 and 3, spindle 17, disk drive spindle assembly 19 and spindle motor 18 (FIG. 1) are precision mounted on a vertically translatable platform 24. Spindle assembly 19 includes a spindle chuck 30, having a disk engaging surface 31, and a disk centering cone 32 mounted centrally of the disk engaging surface 31. Horizontally disposed platform 24 is held loosely in place by side mounted parallel leaf springs 35A,35B and 36A,36B coupled to eccentrically mounted support arms 38A,38B on rotational cranks 37A and 37B. Cranks 37A,37B, when rotated by linear drive means to be described, serve to lift platform 24 during a cartridge loading operation to bring spindle assembly 19 into engagement with disk 15 after the cartridge 14 is properly positioned in upper enclosure 13 and to lower platform 24 in a cartridge unloading operation to clear spindle assembly from upper enclosure 13 to thereby allow the cartridge 14 to be removed from the disk drive system 10. Because of the relatively loose compliant mounting of platform 24 on the cranks, a pair of positioning holes 33A,33B are formed in platform 24 to slidably engage with a mating pair of positioning pins (not shown) depending from the bottom surface of mount plate 12 thereby providing proper "x-y" axis positioning of the platform and the chuck assembly 19.

Figure 4:
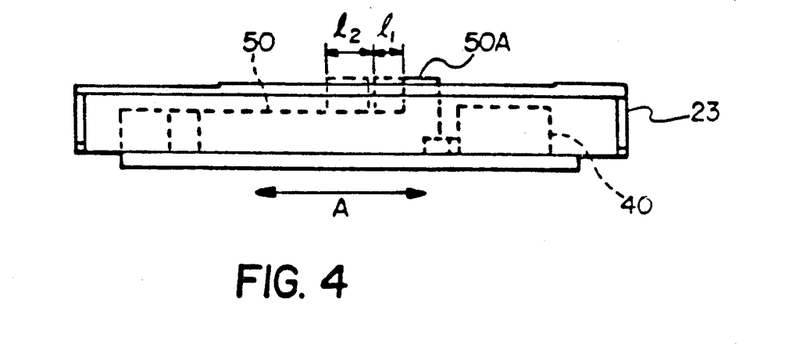
FIG. 4 is a front schematic view of the linear drive of FIG. 2 useful in explaining the operation of the present invention.

Means for rotationally driving cranks 37A,37B includes reversible load drive motor 40, gear train 45, rack gear 46 and linear load drive lever 50 connected by link pins 51A and 51B to drive arms 52A,52B formed at the ends of cranks 37A,37B. Drive motor 40 has its pinion gear 40A drivingly engaged with a face gear 41 which, in turn, is drivingly engaged by a pinion gear to a series of spur/pinion gears 42,43 and 44 which serve as a speed-reduction, torque-increasing drive gear train 45. Rack gear is 46 drivingly engaged by the final pinion gear 44A of gear train 45 and has one end thereof journalled on drive pin 47 integrally formed on load drive lever 50. An elongated leaf spring 48 is located beneath rack 46 serving, in part, to urge the rack teeth into firm engagement with pinion gear 44A. Load drive motor 40 operates through the gear train 45 to drive linear drive lever 50 laterally in the left or right direction illustrated by arrow A in FIGS. 3 and 4, depending on whether disk cartridge 14 is being loaded into or unloaded from disk drive system 10. A serpentine cam slot 54 in drive lever 50 engages with a follower pin 55 on a flag 56 and operates, as load lever 50 moves back and forth, to lower and raise the flag into and out of the path of an optical switch (not shown) mounted on circuit board 27 employed for the purpose of turning the drive motor 40 off at each end of the lateral travel of load lever 50.

Means for laterally positioning disk cartridge 14 in upper enclosure 13 after the cartridge has been inserted includes a pair of cartridge positioning pins 60A and 60B having chamfered upper ends adapted to engage corresponding positioning notches 14A,14B formed in the undersurface of the cartridge 14 (not shown) located at the outer rear corners thereof. Pins 60A,60B are journalled in slots 61A, and 61B at opposite ends of lift lever 62. Cam slots 63A and 63B are formed in lever 62 near the outer ends thereof to engage drive pins 64A and 64B mounted eccentrically on arms 52A and 52B of the rotational drive cranks 37A,37B. A pair of precision alignment holes 65A,65B (FIG. 5) are formed in central mount plate 12 to receive positioning pins 60A,60B for vertical translation into engagement with the notches on the cartridge.

Figure 5:
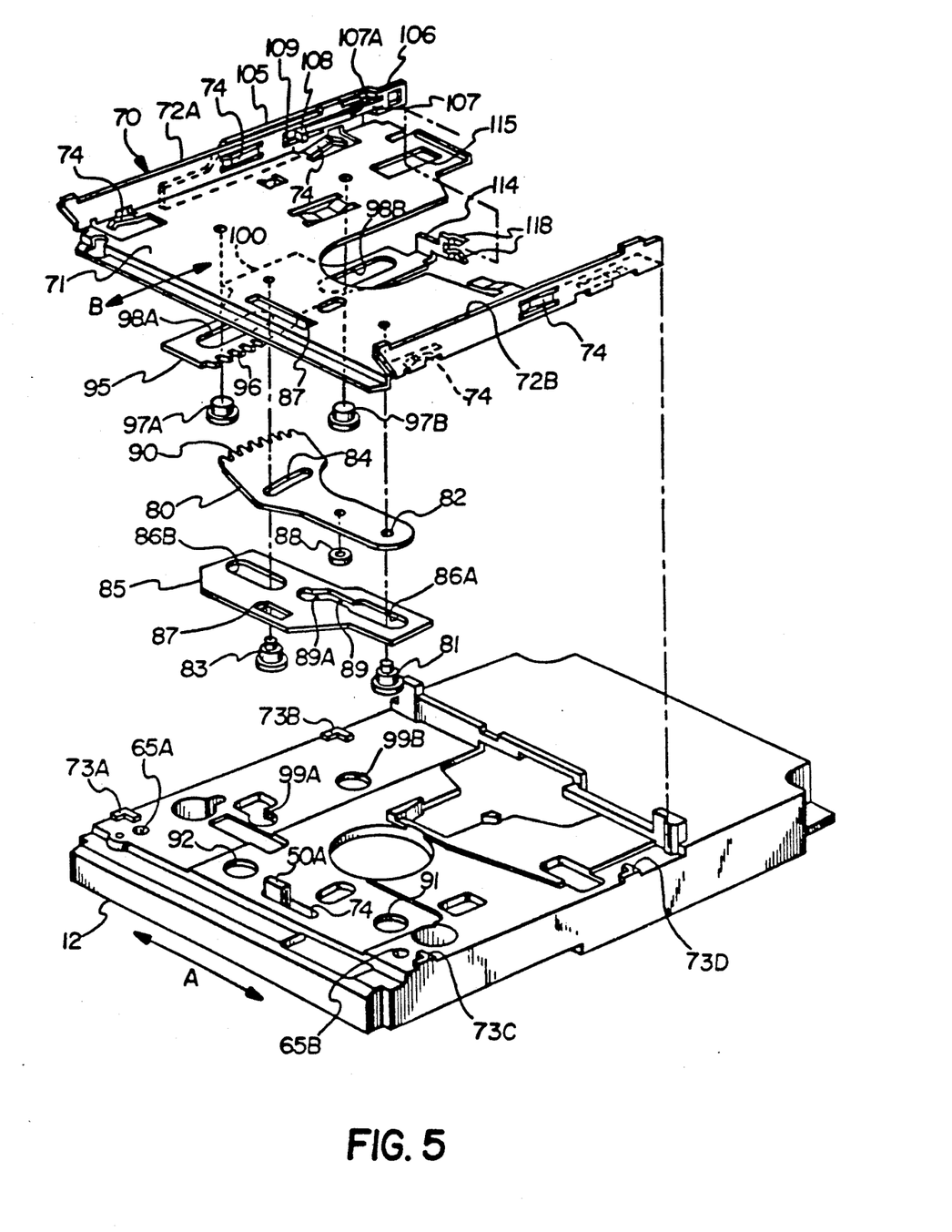
FIG. 5 is an exploded perspective view of the cartridge positioning apparatus of the present invention.
Figure 6:
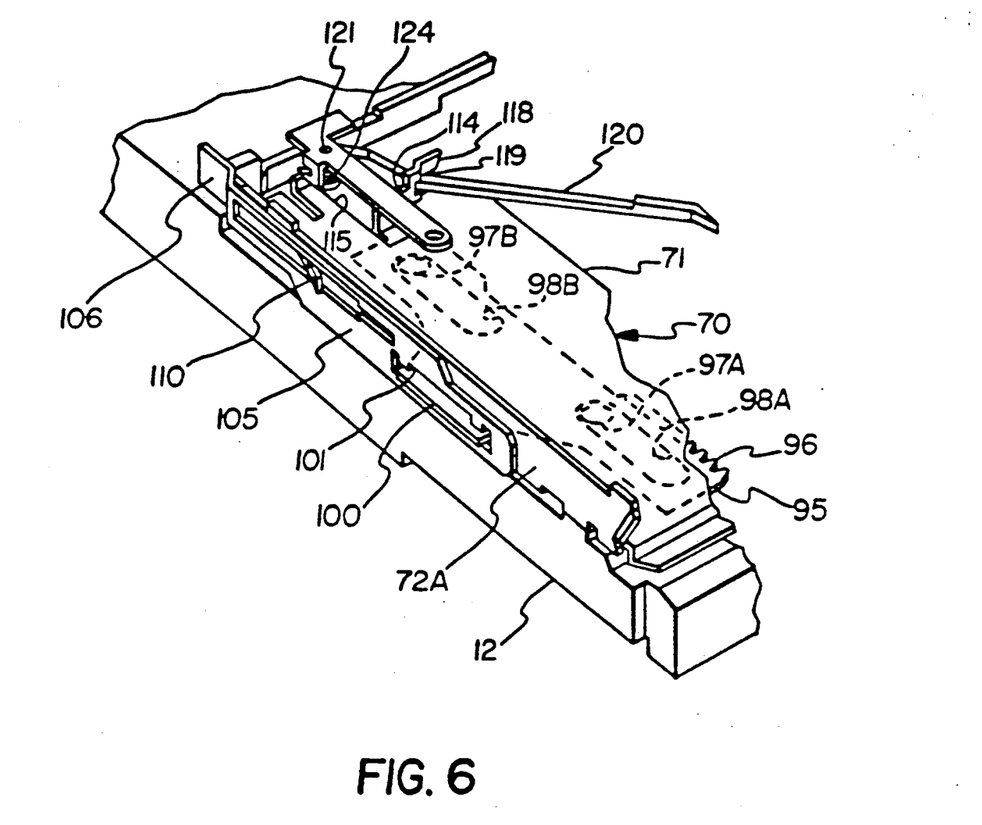
FIG. 6 is a perspective view of a portion of the apparatus of FIG. 5 illustrating certain details thereof.

Reference is now made jointly to FIGS. 5 and 6, where there is shown cartridge positioning apparatus for loading and unloading a disk cartridge 14, under power, in the information storage disk drive system 10. The apparatus includes guide plate 70 formed by a bottom plate 71 and upstanding sides 72A,72B mounted above mount plate 12 on raised lands 73A–73E so as to form a planar interstitial space between the upper surface of mount plate 12 and the undersurface of guide bottom plate 71. Guide 70, together with a cover plate (not shown), comprises cartridge receiving means for receiving a disk cartridge 14 and for holding the cartridge in its own plane after it has been at least partially inserted manually in a longitudinal direction shown by arrow B. Various bent tab fingers 74 are optionally formed in bottom plate 71 and sides 72A,72B to assist in positioning and holding cartridge 14 firmly in the guide 70.

As previously described in connection with FIGS. 2 and 3, a motor actuated linear drive including reversible motor 40, gear train 45, rack 46 and linear load drive lever 50 is mounted on load mount plate 23 beneath central mount plate 12. Drive lever 50 is provided with a vertical drive tab 50A which extends up through elongated slot 74 in mount plate 12 into the interstitial space between mount plate 12 and bottom plate 71 to provide lateral driving motion in the direction of arrow A normal to the longitudinal cartridge movement direction of arrow B.

Means mounted in the interstitial space between mount plate 12 and guide bottom plate 71 includes pivoted sector gear 80 and is responsive to movement of drive tab 50A to convert its lateral driving motion as represented by arrow A into longitudinal driving motion as represented by arrow B. To this end, sector gear 80 is pivotally secured to the underside of bottom plate 71 by a two-tiered pivot post 81 extending through pivot hole 82 and by a similar two-tiered follower post 83 extending through curved slot 84. A lateral linear drive plate 85 is also mounted on posts 81 and 83 which extend through elongated linear slots 86A and 86B. A rectangular aperture 87 is provided at one side of drive plate 85 to receive drive tab 50A. A follower roller 88 is secured to sector gear 80 at a point intermediate pivot hole 82 and the sector gear teeth 90 and is adapted to ride in cam slot 89 which is provided with a ramped cam segment 89A. The angle of ramped cam slot 89A may be selected in relation to the positioning of roller 88 relative to pivot point 82 to provide suitable amplification of the amount of lateral motion of tab 50A into the longitudinal direction of arrow B. Linear drive lever 85 is suspended under bottom plate 71 by the lower shoulders of posts 81,83 which, to keep the interstitial space at a minimum, are positioned in recesses 91 and 92.

Longitudinal linear drive plate 95, having rack gear teeth 96 adapted to engage with and be driven by sector gear teeth 90, is mounted in the interstitial space and is suspended from bottom plate 71 on the shoulders of a pair of posts 97A,97B extending through linear slots 98A,98B. The shoulders of posts 97A,97B may also be positioned in recesses 99A,99B to maintain minimum interstitial space. A lateral extension 100 of drive plate 95 projects out the side of the interstitial space and is engaged in a slot 101 of a load drive plate 105 mounted outside the interstitial space on the upstanding side 72A of guide 70. The rear portion 106 of load plate 105 is bent to provide an offset from which a resilient finger 107 extends forwardly along the inner surface of side 72A. As can best be seen with joint reference to FIGS. 7A and 7B, finger 107 is bent outward slightly at an intermediate point 107A and has a lug 108 mounted on its forward end, the finger and lug fitting within a slot 109 formed in side 72A. A small outwardly bent stationary tab 110 is provided on the end of a finger formed from side 72A in slot 109 to provide a ramp surface which engages a mating back surface of lug 108. The rearmost inward extending surface 108A of lug 108 comprises a cartridge contacting member operative, when load drive plate 105 moves rearwardly thereby camming lug 108 inwardly, to come into engagement with a notch 112 formed in the side of disk cartridge 14.

A tab 114 formed at the rear of longitudinal linear drive plate 95 projects up through a rectangular aperture 115 in bottom plate 71 and comprises another cartridge contacting member which is operative, in this case as drive plate is moved forward, to contact the leading edge of cartridge 14 so as to pull the cartridge forward, under power, as part of the unloading operation.

An extension 118 on tab 114 may be provided with a notch 119 to serve as a support for a shutter pick arm 120 pivoted at point 121 on support lever 122 which, in turn, is pivotably mounted at a pivot point on the upper cover (not shown) of the disk drive system 10. Shutter pick arm 120 serves to engage and open a movable shutter on cartridge 14 as the cartridge is inserted into guide 70. While the cartridge is being inserted, shutter pick arm 120 is pivoted back away from notch 119 against the bias of spring 124 such that, when the cartridge is removed, shutter pick arm 120 will restore its position in notch 119.

Figure 7A:
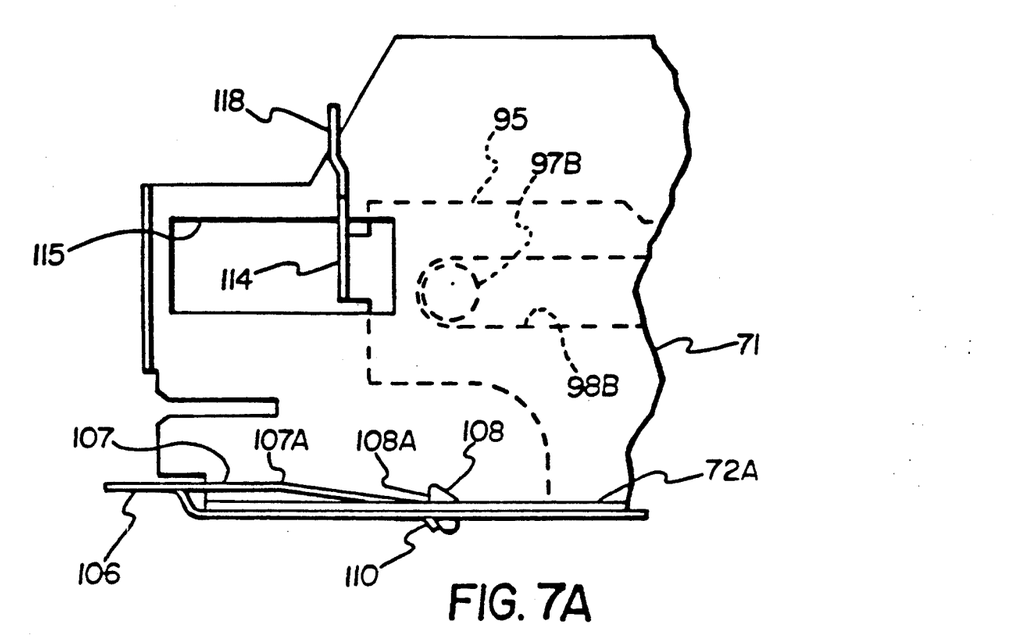
FIGS. 7A and 7B are cutaway views of a portion of the apparatus of FIG. 5 illustrating details of the cartridge-contacting features of the apparatus employed in the loading and unloading operation of the invention.
Figure 7B:
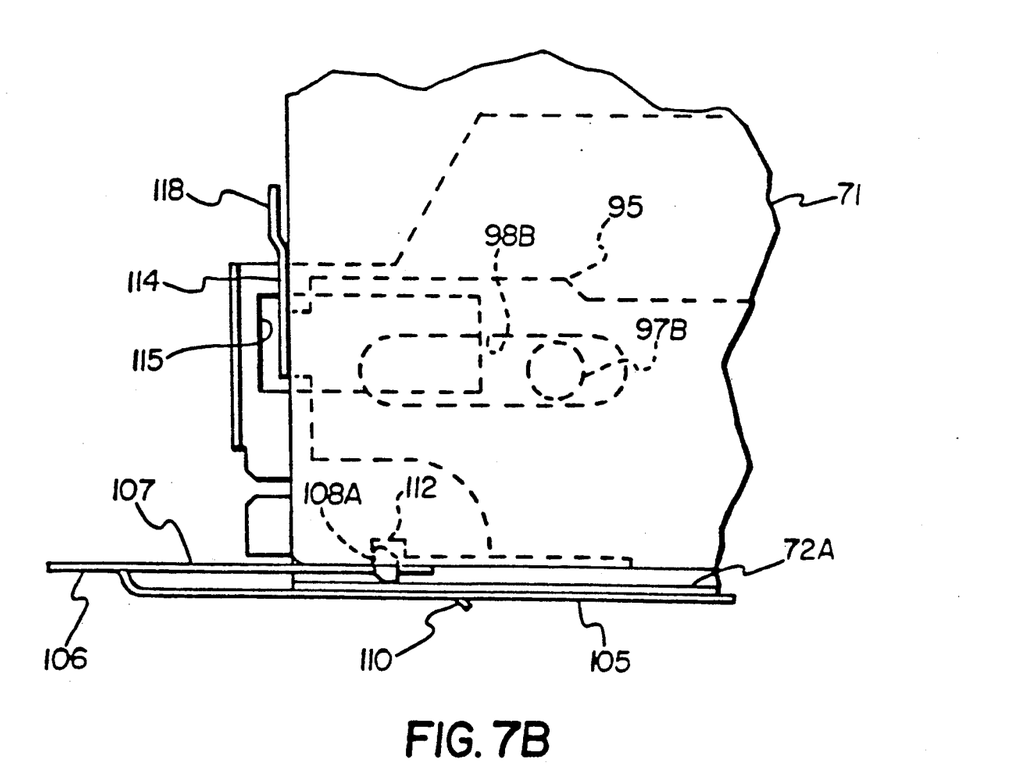
Figure 8A:
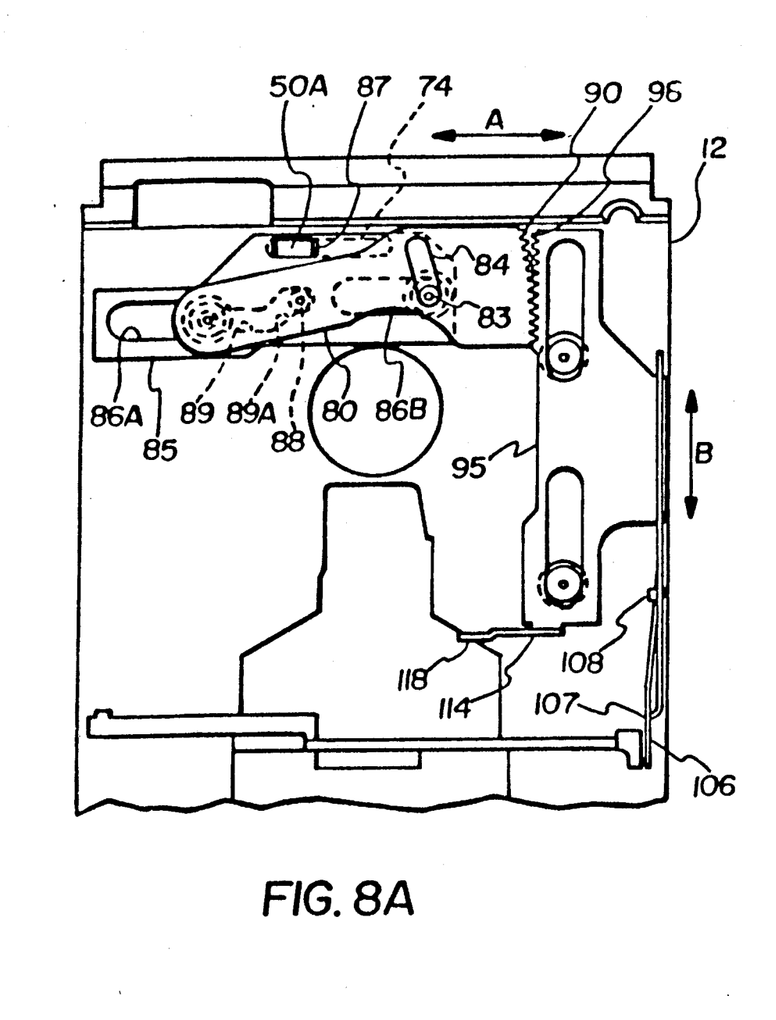
FIGS. 8A and 8B are top plan views of the apparatus of FIG. 5 useful in explaining the operation of the invention.
Figure 8B:
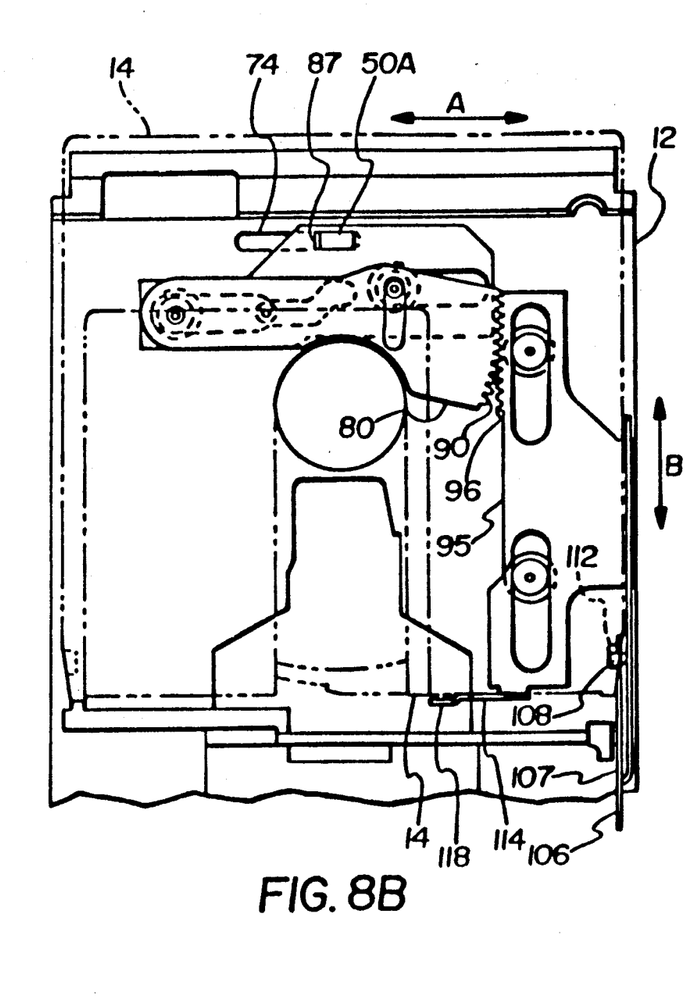

Referring now to FIGS. 8A and 8B, the operation of the cartridge positioning apparatus in loading and unloading the cartridge 14 under power can be readily seen with some of the components, such as cartridge guide 70, removed to aid in the explanation. Thus FIG. 8A illustrates the position of lateral drive tab 50A, lateral drive plate 85, sector gear 80, and longitudinal drive plate 95 prior to insertion of a disk cartridge. Drive tab 50A and drive plate 85 are at their rightmost position in the lateral direction illustrated by arrow A. Follower roller 88 of sector gear 80 is at the leftmost end of cam slot 89 which positions sector gear 80, in the longitudinal direction of arrow B, toward the front of the disk drive system. As a consequence of the engagement of sector gear teeth 90 and rack gear teeth 96, longitudinal drive plate 95 and load drive plate 105 are in the forwardmost position and grab lug 108 is biased outwardly on cam tab 110 (FIG. 7A). When a cartridge 14 is manually inserted into guide 70 and reaches the point at which the leading edge of the cartridge is near tab 114, a switch (not shown) is engaged to activate reversible load drive motor 40 which in turns causes drive tab 50A to translate laterally to the left (downward as viewed in the drawing).

During the initial travel of the drive tab 50A through distance $l_1$ (FIG. 4), drive plate 85 is driven laterally leftward forcing follower roller 88 which is attached to sector gear 80 to move longitudinally as it traverses the ramp cam surface 89A. This action pivots sector gear 80 in the longitudinal direction thus forcing drive plate 95 rearward. This movement continues until follower 88 reaches the end of ramp 89A at the end of initial travel $l_1$ of tab 50A. As longitudinal drive plate 95 is driven rearward, it carries with it load drive plate 105. When load drive plate 105 begins its rearward movement, lug 108 is cammed inward on cam tab 110 bringing lug 108 into engagement with notch 112 in the side of cartridge 14. Cartridge 14 is then pulled by the mechanism just described, under power, into its final position as shown in FIG. 8B. In the meantime, load lever 50 is continuing its lateral travel and, as drive tab 50A moves drive plate 85 through second travel distance $l_2$ (FIG. 4), follower roller 88 remains stationary as it "idles" through the remainder of slot 89. During this period, load lever 50 is operative to cause drive cranks 37A,37B to counter-rotate in the direction needed to raise platform 24, as previously described, to bring centering cone 32 and spindle chuck 30 into engagement with disk 15 in the now properly positioned cartridge 14. When load lever 50 reaches the end of travel distance $l_2$, flag 56 (FIG. 3) is cammed by serpentine cam slot 54 and follower pin 55 out of the path of an optical off switch which removes power from load motor. The serpentine cam slot 54 is designed in conjunction with suitable logic circuitry on printed circuit board 27 such that the third transition of flag 56 either into or out of the optical switch causes motor 40 to be turned off, the first two transitions being ignored. Thus, when load lever 50 is moving leftward, corresponding to loading of the cartridge 14, the logic circuit responds to the third transition movement of flag 56 to turn motor 40 off. Correspondingly, the logic circuit is effective when load lever 50 is moving rightward (unloading) to respond to the third transition movement of flag 56 to turn the motor 40 off.

When it is desired to remove cartridge 14 from the disk drive system, the operator engages a switch (not shown) to apply power to motor 40 in the reverse direction causing load lever 50 to be driven in the rightward lateral direction. During the initial rightward movement of load lever 50, cranks 37A,37B are counter-rotated in the reverse direction to lower platform 24 removing centering cone 32 and chuck spindle 30 from disk 15. During this time, drive tab 50A moves lateral drive plate 85 rightward with sector gear follower roller 88 idling in the straight segment of slot 89. When platform 24 has been fully lowered at the completion of travel distance $l_2$ and the beginning of distance $l_1$, follower roller engages ramp 89A and is forced longitudinally forward thus pivoting sector gear 80 forward. This action drives longitudinal drive plate 95 forward which brings unloading tab 114 into contact with the leading edge of cartridge 14 thereby forcing cartridge 14 outward of the disk drive system by a distance sufficient to allow the user to grab the cartridge and to manually remove it from the drive system. As drive plate 95 moves forward, it carries load drive plate 105 forward thus allowing lug to cam outward on cam tab 110 to free itself from engagement with slot 112 in cartridge 14. When load drive lever 50 reaches its leftmost position, the second downward movement of flag 56 results in turning off of motor 40, as previously described, thus terminating the power unloading process.

As can be appreciated from the foregoing description, there has been disclosed novel apparatus for loading and unloading a disk cartridge, under power, in a disk drive system that assures proper positioning of the cartridge when it is loaded and utilizes the same components for unloading purposes. More particularly, apparatus has been disclosed that is highly compact utilizing almost negligible interstitial space between the cartridge guide and the central mounting plate and that conveniently operates from the same motor actuated drive mechanism used to engage the spindle drive with the storage disk. Very importantly, a small number of drive components are employed, most of which can easily be fabricated from thin plate material on a punch press.

The invention has been described in detail with particular reference to a presently preferred embodiment, but it will be understood that variations and modifications can be effected within the spirit and scope of the invention.

What is claimed is:

1. Apparatus for positioning a disk cartridge, under power, in an information storage disk drive system comprising:
   a mount plate;
   cartridge receiving means for receiving and holding a disk cartridge in its own plane, the cartridge having been at least partially manually inserted in a longitudinal direction, said receiving means being mounted above said mount plate to form a planar interstitial space therebetween;
   motor actuated linear drive means mounted beneath said mount plate and having a drive tab extending through the mount plate into said interstitial space for providing linear driving motion in a lateral direction normal to said longitudinal direction;
   means including a pivoted sector gear mounted in said interstitial space and pivotally responsive to movement of said tab to convert said driving motion from said lateral direction to said longitudinal direction;
   and longitudinal linear drive means at least partially mounted within said interstitial space in engagement with said sector gear and having at least one cartridge contacting member for contacting and moving said cartridge in said longitudinal direction in response to movement of said drive tab in the lateral direction.

2. Apparatus of claim 1 wherein said sector gear includes gear teeth at one end and is pivoted at the other end, and follower means responsive to said driving motion of said drive tab is included on said sector gear intermediate the gear teeth and pivot point to amplify the lateral driving motion of the drive gear into longitudinal driving motion of the sector gear teeth.

3. Apparatus of claim 1 in which only a portion of said linear driving motion is employed for positioning of said cartridge while a remaining portion of said linear driving motion is used for a purpose other than positioning of said cartridge.

4. Apparatus of claim 2 wherein only a portion of said linear driving motion is employed for positioning of said cartridge while a remaining portion of said linear driving motion is used for a purpose other than positioning of said cartridge, and wherein a linear lateral drive plate means is included for coupling said lateral driving motion of said drive tab to said sector gear, said lateral drive plate including a cam slot engaged with said follower means, said cam slot having a first ramp portion operative to convert lateral driving motion of said drive tab to amplified longitudinal driving motion of said sector gear teeth.

5. Apparatus of claim 1 in which said longitudinal drive means includes a longitudinal linear drive plate mounted in said interstitial space with rack gear teeth in engagement with said sector gear and with an unloading tab extending into said cartridge receiving means adapted to contact said cartridge when said longitudinal linear drive plate is moved in a forward direction by said sector gear to move said cartridge, under power, to an unload position whereby an operative can grasp and remove said cartridge manually from said receiving means.

6. Apparatus according to claim 5 further including a load drive plate drivingly engaged with said longitudinal drive plate and positioned at the side of said cartridge receiving means outside said interstitial space, said load drive plate having a cartridge-engaging member biased outwardly of said cartridge receiving means when said load drive plate is in a forward, cartridge-unloaded position and adapted to moved inward into engagement with said cartridge after said cartridge is manually inserted by a predetermined amount and said motor is actuated to begin rearward movement of said load drive plate whereby said cartridge is pulled, under power, to a predetermined loaded position in said disk drive system.

* * * * *